United States Patent
Kahn et al.

(10) Patent No.: US 8,498,917 B2
(45) Date of Patent: *Jul. 30, 2013

(54) SYSTEMS AND METHODS FOR PROVIDING MIGRATION AND PERFORMANCE MATRICES

(75) Inventors: Markus Helmut Kahn, Heidelberg (DE); Jens-Peter Jensen, Ludwigshafen (DE); Marcus Baumann, Sandhausen (DE)

(73) Assignee: SAP AG, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/475,410

(22) Filed: May 18, 2012

(65) Prior Publication Data

US 2012/0233091 A1     Sep. 13, 2012

Related U.S. Application Data

(62) Division of application No. 11/191,985, filed on Jul. 29, 2005, now Pat. No. 8,200,557.

(30) Foreign Application Priority Data

Jun. 8, 2005 (EP) ..................................... 05012313

(51) Int. Cl.
    *G06Q 40/00* (2012.01)
(52) U.S. Cl.
    USPC ........................................ 705/36 R; 705/35
(58) Field of Classification Search
    CPC ................................ G06Q 40/00; G06Q 40/06
    USPC .................................................... 705/35–40
    See application file for complete search history.

(56) References Cited

U.S. PATENT DOCUMENTS

| | | | | |
|---|---|---|---|---|
| 5,884,287 | A * | 3/1999 | Edesess | 705/36 R |
| 6,088,676 | A * | 7/2000 | White, Jr. | 705/7.39 |
| 6,405,179 | B1 * | 6/2002 | Rebane | 705/36 R |
| 6,484,152 | B1 | 11/2002 | Robinson | |
| 7,383,219 | B1 | 6/2008 | Jennings et al. | |
| 7,469,227 | B2 | 12/2008 | Breeden et al. | |
| 7,530,490 | B1 | 5/2009 | Finkemeier et al. | |
| 7,539,637 | B2 * | 5/2009 | Gatto | 705/36 R |
| 7,702,556 | B2 * | 4/2010 | Charnley, Jr. | 705/36 R |
| 7,761,354 | B2 | 7/2010 | Kling et al. | |
| 8,095,442 | B2 | 1/2012 | Baumann et al. | |
| 2003/0088492 | A1 | 5/2003 | Damschroder | |

(Continued)

OTHER PUBLICATIONS

Michel Araten, Michael Jacobs Jr., Peeyush Varshney, and Claude R. Pellegrino, "An Internal Ratings Migration Study," The RMA Journal, Apr. 2005, pp. 92-97.

(Continued)

*Primary Examiner* — Eric T Wong
*Assistant Examiner* — Ed Baird
(74) *Attorney, Agent, or Firm* — Finnegan, Henderson, Farabow, Garrett & Dunner LLP

(57) ABSTRACT

Systems and methods are provided for computing migration and performance matrices. The matrices may provide risk and performance data, as well as different views on the data useful for making and monitoring investment decisions. The migration and performance matrices may bring together data to reflect information on the likelihood that a rated entity will change its current rating within a given time period, information reflecting retention rates, and information describing the effect of changed exchanged rates on different data, for example.

12 Claims, 12 Drawing Sheets

U.S. PATENT DOCUMENTS

| | | |
|---|---|---|
| 2003/0135450 A1 | 7/2003 | Aguais et al. |
| 2003/0144945 A1 | 7/2003 | Opsahl-Ong et al. |
| 2003/0233302 A1 | 12/2003 | Weber et al. |
| 2005/0027645 A1 | 2/2005 | Lui et al. |
| 2005/0071266 A1 | 3/2005 | Eder |
| 2005/0262013 A1 | 11/2005 | Guthner et al. |
| 2006/0015425 A1 | 1/2006 | Brooks |
| 2006/0069635 A1 | 3/2006 | Ram et al. |
| 2006/0229963 A1 | 10/2006 | Creager et al. |
| 2006/0280302 A1 | 12/2006 | Baumann et al. |
| 2006/0282360 A1 | 12/2006 | Kahn et al. |
| 2007/0055599 A1 | 3/2007 | Arnott |
| 2008/0065522 A1 | 3/2008 | Diffenderffer |

OTHER PUBLICATIONS

Yusuf Jafry and Til Schuermann, "Measurement, Estimation and Comparison of Credit Migration Matrices," printed Mar. 2004, pp. 1-52.

Anil Bangia, Francis X. Diebold, and Til Schuermann, "Ratings Migration and the Business Cycle, With Applications to Credit Portfolio Stress Testing," The Wharton School, University of Pennsylvania, Sep. 28, 2000, pp. 1-44.

* cited by examiner

FIGURE 4

Dialog Structure
- ▽ ☐ Migration Matrix and Acquisition Matrix
  - ☐ Matrix Categories (Name)
  - ☐ Granularity Characteristics for Matrix
  - ☐ Data Source of Rating Char.: Beg. and End
  - ☐ Data Source of Key Figures: Beg. and End
  - ☐ Use of Specific Fields
  - ☐ Inflow and Outflow (Characteristic Values)

| Matrix ID | MTX_USD_01 |
|---|---|

Granularity Characteristics for Matrix

| Granularity Characteristics | Description |
|---|---|
| /1BA/SCBUSECAT | Sector Category |
| /1BA/SCRATRSYS | Rating Model |

Dialog Structure
- ▽ ☐ Migration Matrix and Acquisition
  - ☐ Matrix Categories (Name)
  - ☐ Data Source of Rating Char.
  - ☐ Granularity Characteristics
  - ☐ Data Source of Key Figures
  - ☐ Use of Specific Fields
  - ☐ Inflow and Outflow

| Matrix ID | MTX_USD_01 |
|---|---|

Data Source of Rating Char. Bag. and End of Period

| Rating Char.: D | Name | Rating Characte | Name | Rating Characte | Name |
|---|---|---|---|---|---|
| /BA/SCRATMOOD | Moody's Rating | /BIC/SCHDBRATO | Rating in t0 | /BIC/SCHDRAT1 | Rating in t1 |

Dialog Structure
- ▽ ☐ Migration Matrix and Acquisition
  - ☐ Matrix Categories (Name)
  - ☐ Inflow and Outflow
  - ☐ Data Source of Rating Char.
  - ☐ Data Source of Key Figures:
  - ☐ Use of Specific Fields
  - ☐ Granularity Characteristics

| Matrix ID | MTX_USD_01 |
|---|---|

Inflow and Outflow (Characteristic Values)

| In/Outflow | Character Value Inflow/Outflow |
|---|---|
| 01 No Inflow / Outflow | |
| 02 Inflow | 1 |
| 03 Outflow | 2 |

600

| Segment ID SID | Rating Method RM | Business Partner BUPA | Rating Valid From RDAT | Rating RAT | Inflow/Outflow IO | Utilization UTIL | Currency CURR |
|---|---|---|---|---|---|---|---|
| 1 | INTERNAL | BUPA_01 | 21.04.1999 | A |  | 100.000,00 | USD |
| 1 | INTERNAL | BUPA_01 | 26.04.2000 | A |  | 80.000,00 | USD |
| 1 | INTERNAL | BUPA_02 | 14.05.1999 | B |  | 100.000,00 | USD |
| 1 | INTERNAL | BUPA_02 | 12.08.2000 | C |  | 50.000,00 | USD |
| 1 | INTERNAL | BUPA_03 | 01.08.1999 | A |  | 50.000,00 | USD |
| 1 | INTERNAL | BUPA_03 | 01.08.2000 | B | 2 | 50.000,00 | USD |
| 1 | INTERNAL | BUPA_04 | 14.02.1999 | C |  | 200.000,00 | USD |
| 1 | INTERNAL | BUPA_04 | 18.09.2000 | C |  | 150.000,00 | USD |
| 1 | INTERNAL | BUPA_05 | 19.01.2000 | D | 1 | 100.000,00 | USD |
| 1 | INTERNAL | BUPA_06 | 04.11.1999 | B |  | 150.000,00 | USD |
| 1 | INTERNAL | BUPA_06 | 23.05.2000 | A |  | 200.000,00 | USD |
| 1 | INTERNAL | BUPA_07 | 25.09.1999 | B |  | 50.000,00 | USD |
| 1 | INTERNAL | BUPA_07 | 23.12.2000 | B |  | 30.000,00 | USD |

FIGURE 9

| Segment ID SID | Rating Method RM | Business Partner BUPA |
|---|---|---|
| 1 | INTERNAL | BUPA_01 |
| 1 | INTERNAL | BUPA_02 |
| 1 | INTERNAL | BUPA_03 |
| 1 | INTERNAL | BUPA_04 |
| 1 | INTERNAL | BUPA_05 |
| 1 | INTERNAL | BUPA_06 |
| 1 | INTERNAL | BUPA_07 |

FIGURE 10

| SID | RM | BUPA | RT0 | RT1 | UT0 | UT1 | FX | CURR | IO |
|---|---|---|---|---|---|---|---|---|---|
| 1 | INTERNAL | BUPA_01 | A | A | 100.000,00 | 80.000,00 | 0 | USD | |
| 1 | INTERNAL | BUPA_02 | B | C | 100.000,00 | 50.000,00 | 0 | USD | |
| 1 | INTERNAL | BUPA_03 | A | | 50.000,00 | | 0 | USD | 2 |
| 1 | INTERNAL | BUPA_04 | C | C | 200.000,00 | 150.000,00 | 0 | USD | |
| 1 | INTERNAL | BUPA_05 | | D | | 100.000,00 | 0 | USD | 1 |
| 1 | INTERNAL | BUPA_06 | B | A | 150.000,00 | 200.000,00 | 0 | USD | |
| 1 | INTERNAL | BUPA_07 | B | B | 50.000,00 | 30.000,00 | 0 | USD | |

FIGURE 11

| SID | RM | RT0 | RT1 | IO | CNT | UT0 | UT1 | FX | CURR |
|---|---|---|---|---|---|---|---|---|---|
| 1 | INTERNAL | A | A | | 1 | 100.000,00 | 80.000,00 | 0 | USD |
| 1 | INTERNAL | B | A | | 1 | 150.000,00 | 200.000,00 | 0 | USD |
| 1 | INTERNAL | B | B | | 1 | 50.000,00 | 30.000,00 | 0 | USD |
| 1 | INTERNAL | B | C | | 1 | 100.000,00 | 50.000,00 | 0 | USD |
| 1 | INTERNAL | C | C | | 1 | 200.000,00 | 150.000,00 | 0 | USD |
| 1 | INTERNAL | | D | 1 | 1 | | 100.000,00 | 0 | USD |
| 1 | INTERNAL | A | | 2 | 1 | 50.000,00 | | 0 | USD |

FIGURE 12

| SID | RM | KEY | DESCRIPTION | RTNG | RT0 | RT1 | CNT | UTLZ | UT0 | UT1 | FX | CURR |
|---|---|---|---|---|---|---|---|---|---|---|---|---|
| 1 | INTERNAL | 1 | 01 portfolio at t0 | | A | | 2 | | 150000 | 80000 | 0 | USD |
| 1 | INTERNAL | 1 | 01 portfolio at t0 | | B | | 3 | | 300000 | 280000 | 0 | USD |
| 1 | INTERNAL | 1 | 01 portfolio at t0 | | A | | 1 | | 200000 | 150000 | 0 | USD |

FIGURE 13

| SID | RM | KEY | DESCRIPTION | RTNG | RT0 | RT1 | CNT | UTLZ | UT0 | UT1 | FX | CURR |
|---|---|---|---|---|---|---|---|---|---|---|---|---|
| 1 | INTERNAL | 2 | 02 portfolio at t1 | | | A | 2 | | 250000 | 280000 | 0 | USD |
| 1 | INTERNAL | 2 | 02 portfolio at t1 | | | B | 1 | | 50000 | 30000 | 0 | USD |
| 1 | INTERNAL | 2 | 02 portfolio at t1 | | | C | 2 | | 300000 | 200000 | 0 | USD |
| 1 | INTERNAL | 2 | 02 portfolio at t1 | | | D | 1 | | 0 | 100000 | 0 | USD |

FIGURE 14

| SID | RM | KEY | DESCRIPTION | RTNG | RT0 | RT1 | CNT | UTLZ | UT0 | UT1 | FX | CURR |
|---|---|---|---|---|---|---|---|---|---|---|---|---|
| 1 | INTERNAL | 3 | 03 in-migrations from ... to ... | | B | A | 1 | | 150000 | 200000 | 0 | USD |
| 1 | INTERNAL | 3 | 03 in-migrations from ... to ... | | B | C | 1 | | 100000 | 50000 | 0 | USD |

FIGURE 15

| SID | RM | KEY | DESCRIPTION | RTNG | RT0 | RT1 | CNT | UTLZ | UT0 | UT1 | FX | CURR |
|---|---|---|---|---|---|---|---|---|---|---|---|---|
| 1 | INTERNAL | 4 | 04 out-migrations to ... from ... | | A | B | 1 | | 150.000- | 200.000- | 0 | USD |
| 1 | INTERNAL | 4 | 04 out-migrations to ... from ... | | C | B | 1 | | 100.000- | 50.000- | 0 | USD |

FIGURE 16

| SID | RM | KEY | DESCRIPTION | RTNG | RT0 | RT1 | CNT | UTLZ | UT0 | UT1 | FX | CURR |
|---|---|---|---|---|---|---|---|---|---|---|---|---|
| 1 | INTERNAL | 5 | 05 customers lost (after t0) | | A | | 1 | | 50.000- | | 0 | USD |

FIGURE 17

| SID | RM | KEY | DESCRIPTION | RTNG | RT0 | RT1 | CNT | UTLZ | UT0 | UT1 | FX | CURR |
|---|---|---|---|---|---|---|---|---|---|---|---|---|
| 1 | INTERNAL | 6 | 06 customers won (at t1) | | | D | 1 | | | 100000 | 0 | USD |

FIGURE 18

| SID | RM | KEY | DESCRIPTION | RTNG | RT0 | RT1 | CNT | UTLZ | UT0 | UT1 | FX | CURR |
|---|---|---|---|---|---|---|---|---|---|---|---|---|
| 1 | INTERNAL | 7 | 07 customer acquisitions | A | | | 1 | 50.000- | | | 0 | USD |
| 1 | INTERNAL | 7 | 07 customer acquisitions | D | | | 1 | 100000 | | | 0 | USD |

FIGURE 19

| SID | RM | KEY | DESCRIPTION | RTNG | RT0 | RT1 | CNT | UTLZ | UT0 | UT1 | FX | CURR |
|---|---|---|---|---|---|---|---|---|---|---|---|---|
| 1 | INTERNAL | 10 | 10 portfolio after migrations at t1 | A | | | 3 | 350000 | | | 0 | USD |
| 1 | INTERNAL | 10 | 10 portfolio after migrations at t1 | B | | | 1 | 50000 | | | 0 | USD |
| 1 | INTERNAL | 10 | 10 portfolio after migrations at t1 | C | | | 2 | 250000 | | | 0 | USD |

FIGURE 20

| SID | RM | KEY | DESCRIPTION | RTNG | RT0 | RT1 | CNT | UTLZ | UT0 | UT1 | FX | CURR |
|---|---|---|---|---|---|---|---|---|---|---|---|---|
| 1 | INTERNAL | 8 | 08 changed volume | A | | | | 20.000- | | | 0 | USD |
| 1 | INTERNAL | 8 | 08 changed volume | B | | | | 20.000- | | | 0 | USD |
| 1 | INTERNAL | 8 | 08 changed volume | C | | | | 50.000- | | | 0 | USD |
| 1 | INTERNAL | 8 | 08 changed volume | D | | | | 100.000- | | | 0 | USD |

FIGURE 21

| SID | RM | KEY | DESCRIPTION | RTNG | RT0 | RT1 | CNT | UTLZ | UT0 | UT1 | FX | CURR |
|---|---|---|---|---|---|---|---|---|---|---|---|---|
| 1 | INTERNAL | 9 | 09 acquisition performance | A | | | | 70.000- | | | 0 | USD |
| 1 | INTERNAL | 9 | 09 acquisition performance | B | | | | 20.000- | | | 0 | USD |
| 1 | INTERNAL | 9 | 09 acquisition performance | C | | | | 50.000- | | | 0 | USD |
| 1 | INTERNAL | 9 | 09 acquisition performance | D | | | | 100000 | | | 0 | USD |

FIGURE 22

| SID | RM | KEY | DESCRIPTION | RTNG | RT0 | RT1 | CNT | UTLZ | UT0 | UT1 | FX | CURR |
|---|---|---|---|---|---|---|---|---|---|---|---|---|
| 1 | INTERNAL | 1 | 01 portfolio at t0 | | A | | 2 | | 150000 | 80000 | 0 | USD |
| 1 | INTERNAL | 1 | 01 portfolio at t0 | | B | | 3 | | 300000 | 280000 | 0 | USD |
| 1 | INTERNAL | 1 | 01 portfolio at t0 | | C | | 1 | | 200000 | 150000 | 0 | USD |
| 1 | INTERNAL | 2 | 02 portfolio at t1 | | | A | 2 | | 250000 | 280000 | 0 | USD |
| 1 | INTERNAL | 2 | 02 portfolio at t1 | | | B | 1 | | 50000 | 30000 | 0 | USD |
| 1 | INTERNAL | 2 | 02 portfolio at t1 | | | C | 2 | | 300000 | 200000 | 0 | USD |
| 1 | INTERNAL | 2 | 02 portfolio at t1 | | | D | 1 | | 0 | 100000 | 0 | USD |
| 1 | INTERNAL | 3 | 03 in-migrations from … to … | | B | A | 1 | | 150000 | 200000 | 0 | USD |
| 1 | INTERNAL | 3 | 03 in-migrations from … to …. | | B | C | 1 | | 100000 | 50000 | 0 | USD |
| 1 | INTERNAL | 4 | 04 out-migrations to … from … | | A | B | 1 | | 150.000- | 200.000- | 0 | USD |
| 1 | INTERNAL | 4 | 04 out-migrations to … from … | | C | B | 1 | | 100.000- | 50.000- | 0 | USD |
| 1 | INTERNAL | 5 | 05 customers lost (after t0) | | A | | 1 | | 50.000- | | 0 | USD |
| 1 | INTERNAL | 6 | 06 customers won (at t1) | | | D | 1 | | | 100000 | 0 | USD |
| 1 | INTERNAL | 7 | 07 customer acquisitions | A | | | 1 | 50.000- | | | 0 | USD |
| 1 | INTERNAL | 7 | 07 customer acquisitions | D | | | 1 | 100000 | | | 0 | USD |
| 1 | INTERNAL | 8 | 08 changed volume | A | | | | 20.000- | | | 0 | USD |
| 1 | INTERNAL | 8 | 08 changed volume | B | | | | 20.000- | | | 0 | USD |
| 1 | INTERNAL | 8 | 08 changed volume | C | | | | 50.000- | | | 0 | USD |
| 1 | INTERNAL | 8 | 08 changed volume | D | | | | 100.000- | | | 0 | USD |
| 1 | INTERNAL | 9 | 09 acquisition performance | A | | | | 70.000- | | | 0 | USD |
| 1 | INTERNAL | 9 | 09 acquisition performance | B | | | | 20.000- | | | 0 | USD |
| 1 | INTERNAL | 9 | 09 acquisition performance | C | | | | 50.000- | | | 0 | USD |
| 1 | INTERNAL | 9 | 09 acquisition performance | D | | | | 100000 | | | 0 | USD |
| 1 | INTERNAL | 10 | 10 portfolio after migrations at t1 | A | | | 3 | 350000 | | | 0 | USD |
| 1 | INTERNAL | 10 | 10 portfolio after migrations at t1 | B | | | 1 | 50000 | | | 0 | USD |
| 1 | INTERNAL | 10 | 10 portfolio after migrations at t1 | C | | | 2 | 250000 | | | 0 | USD |

FIGURE 23

SYSTEMS AND METHODS FOR PROVIDING MIGRATION AND PERFORMANCE MATRICES

RELATED APPLICATION

This application is a divisional of Application No. 11/191,985, filed Jul. 29, 2005 now U.S. Pat. No. 8,200,557, which claims the benefit of priority from prior patent application EP 05012313.2, filed Jun. 8, 2005, the entire contents of both of which are expressly incorporated herein by reference.

BACKGROUND

I. Technical Field

The present invention generally relates to computerized systems and methods for analyzing financial data. More particularly, the invention relates to systems and methods for computing and manipulating migration and performance matrices in order to analyze risk and performance.

II. Background Information

In today's environment of increased competition and converging markets, financial institutions must manage investment risks and returns on an integrated basis to gain a business advantage. Many financial services institutions have grown beyond their traditional businesses and have developed diverse operations. Due to increasing complexity, interrelated risks, and volatile markets, understanding the value of businesses, individually or collectively, poses a significant challenge to financial institutions. In order to meet investor, rating agency, and regulatory expectations, financial institutions increasingly require business processes and computing tools that effectively and efficiently assist strategic and operational decision-making.

Financial institutions are addressing these challenges by developing Risk-Adjusted Performance Measurement (RAPM) and Economic Capital frameworks. RAPM and economic capital frameworks allow financial institutions to aggregate their risk exposures and measure performance across diverse products on a consistent basis. Financial institutions that use RAPM and economic capital frameworks may move beyond traditional accounting, regulatory, and rating agency methods of determining capital and performance data for a business.

Building on economic fundamentals and financial risk modeling, these frameworks allow financial institutions to relate risk with profitability. In doing so, management may deploy capital more efficiently, actively manage risks, gain a competitive advantage in the marketplace, and meet regulatory requirements. For example, by considering underlying risks (e.g., credit, market, operational, and insurance) and relationships of risks and products, companies can better estimate performance based on specific risk and diversification benefits of a company's operations.

RAPM and economic capital frameworks also provide benefits, such as allowing financial instructions to: analyze economic capital adequacy and usage; view economic/risk relationships in annual budgeting and strategic planning; allow for the efficient deployment of capital and resources; determine a business, product, and customer mix that yields an optimal return; drive an incentive compensation by linking performance and risk taken; enhance investor relations, regulatory, and rating agency discussions; and improve their ability to price transactions. Aligning decision-making across business processes within a financial institution is a key aspect of RAPM and economic capital frameworks. As a result, all involved parties, including enterprise management, business units, risk managers, and account managers act within a consistent framework. Decisions are based on a common understanding of the key decision criteria, which may cause a single decision to have a large impact on the overall performance of the financial institution. As a result, involved parties have much better information when making decisions.

Performance of a financial institution is measured based on the risk-adjusted performance measurement approach taken. As a result, under and over performance of a company may be easily identified. To adequately measure performance results, however, one needs to have further background on the reasons behind business decisions to understand why a specific performance was achieved. The RAPM results often do not provide decision makers with adequate details to make informed decisions. Instead, RAPM results deliver static figures that do not provide a sufficient view of business performance. Since decision makers prefer to understand the actions and events that drove the performance of the period under consideration, decision makers require more detailed information. Detailed information of the kind needed by decision makes may be provided by migration matrices.

Typically, migration matrices include detailed information on the actions and events that influenced RAPM results within a specific period. In a typical financial institution, credit risk is usually the most important risk type, followed by market risk and then operational risk. In particular, a focus of migration matrices is to provide an understanding of the credit risk of related businesses. Migration matrices deliver in depth information on contributions of the following actions and events within the period under consideration: changed credit risk assessment of existing customers; business with new customers; customers lost; business extended with existing customers; business reduced with existing customers; and changes due to changed currency exchange rates.

In current implementations of migration matrices, however, the above actions and events are measured without relating the available data to RAPM and economic capital frameworks. For example, rating agencies provide migration matrices on the likelihood that a business or investment, typically referred to by financial institutions as a rated entity, will change its current rating within a given timeframe. However, business units may separately provide information on retention rates and controlling units may further provide separately information on the effect of changed exchange rates for different measures. Accordingly, migration and performance matrices are needed that combine risk and performance data in one framework that is consistent with the overall RAPM and economic capital framework.

Furthermore, current software tools are typically not compatible or flexible enough to provide an overview of all of the data pertaining to entities in a financial institution's portfolio. For example, such solutions do not take into account measurements such as the inflows and outflows that occur during a measured time period, currency conversions, or acquisition performance. As a result, decision makers are limited in the data that is available to them when making key investment decisions.

In view of the foregoing, there is a need for improved systems and methods for creating migration and performance matrices that relate data from RAPM and economic capital frameworks. There is therefore a need for a consistent approach or computerized platform that allows a user to analyze migration and performance matrices and other data so that decision makers are presented with an overview of data that assists financial institution when making and monitoring investment decisions.

SUMMARY

In one embodiment consistent with the present invention, a method is provided for computing a migration and performance matrix using a data processing system. The method comprises electronically receiving a selection of rated entities from a user; retrieving electronically, from a database, mass data for the selected entities for a rating period; and reading ratings and utilizations for the selected entities for the rating period to create a base matrix before aggregation. Further, the base matrix before aggregation provides a basis for completing the migration and performance matrix.

In another embodiment, a system is provided for computing a migration and performance matrix. The system comprises a graphical user interface that enables a user to make a selection of rated entities; means for receiving the selection of rated entities from the user; means for retrieving data from a database for the selected entities; and means for reading ratings and utilizations for the selected entities for at least one rating period to create a base matrix before aggregation. Further, the base matrix before aggregation provides a basis for computing the migration and performance matrix.

In a further embodiment, a method is provided for computing a migration and performance matrix using a data processing system. The method comprises electronically receiving a selection of rated entities from a user; retrieving electronically, from a database, mass data for the selected entities for a rating period; reading ratings and utilizations for the selected entities for the rating period to create a base matrix before aggregation; aggregating data in the base matrix before aggregation to form a base matrix after aggregation; electronically computing at least one additional matrix; using the at least one additional matrix to generate a target matrix; and saving the target matrix to a database.

In yet another embodiment, a system is provided for computing a migration and performance matrix. The system comprises means for electronically receiving a selection of rated entities from the user; means for electronically retrieving data from a database for the selected entities; means for reading ratings and utilizations for the selected entities for at least one rating period to create a base matrix before aggregation; means for aggregating data in the base matrix before aggregation to form a base matrix after aggregation; means for electronically computing at least one additional matrix; means for using the at least one additional matrix to generate a target matrix; and means saving the target matrix to a database.

In still yet another embodiment, a database structure is provided for supporting analysis of financial risk and performance. The database structure comprises a list of rated entities that are read from a database; data for each of the rated entities for a rating period; ratings and utilizations for the rated entities for the rating period; and an inflow or an outflow status for each rated entity.

In still yet another embodiment, a computer-implemented method is provided for determining a matrix for use by a financial institution. The method comprises electronically receiving mass data from at least one database, the mass data including sets of rows and sets of columns, wherein each row corresponds to a record, and each columns includes fields of data characteristics; selecting at least a portion of the mass data and aggregation operations to be carried out by a processor to create aggregated records; electronically forming at least one matrix comprising the aggregated records; and using the at least one matrix to calculate a target matrix.

In yet another embodiment, a method is provided for performing financial analysis using a data processing system. The method comprises electronically receiving a selection of rated entities from a user; electronically retrieving, from a database, mass data for the selected entities for a rating period; using a processor to read ratings and utilizations for the selected entities for the rating period to create a base matrix before aggregation; aggregating data in the base matrix to form a base matrix after aggregation; electronically computing at least one additional matrix; using the at least one additional matrix to generate a target matrix; and providing the target matrix to assist the user in making a financial decision.

In yet another embodiment, a database structure is provided for supporting analysis of rated entities by a financial institution. The database structure comprises a list of rated entities that are read from a database; data for each of the rated entities for a rating period; and ratings and utilizations for the rated entities for the rating period. The ratings are assigned to entities that have been added or lost to a portfolio, entities that have reduced or increased business with a financial institution, and entities that have a low or high credit risk.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate various embodiments and aspects of the present invention. In the drawings:

FIG. 4 is an exemplary interface for defining granularity fields of database tables used to calculate the migration and performance matrix;

FIG. 5 is an exemplary interface for setting the data source of the rating for the beginning and end of a rating period;

FIG. 6 is an exemplary interface for specifying inflows and outflows;

FIG. 9 is an exemplary table of collected data;

FIG. 10 is an exemplary table including a subset of data shown in FIG. 9;

FIG. 11 is an exemplary table prior to aggregation of data;

FIG. 12 is an exemplary table after aggregation of data;

FIG. 13 is an exemplary table of data referred to as portfolio matrix 01;

FIG. 14 is an exemplary table of data referred to as portfolio matrix 02;

FIG. 15 is an exemplary table of data referred to as in-and-out migration matrix 03;

FIG. 16 is an exemplary table of data referred to as in-and-out matrix migration 04;

FIG. 17 is an exemplary table of data referred to as an entities lost matrix 05;

FIG. 18 is an exemplary table of data referred to as an entities won matrix 06;

FIG. 19 is an exemplary table of data referred to as an entity acquisition matrix 07;

FIG. 20 is an exemplary table of data referred to as portfolio after migrations at an initial time matrix 10;

FIG. 21 is an exemplary table of data referred to as changed volume matrix 08;

FIG. 22 is an exemplary table of data referred to as acquisition performance matrix 09; and FIG. 23 is an exemplary table showing the resulting migration and performance matrix, consistent with the present invention.

DETAILED DESCRIPTION

Figure 1:
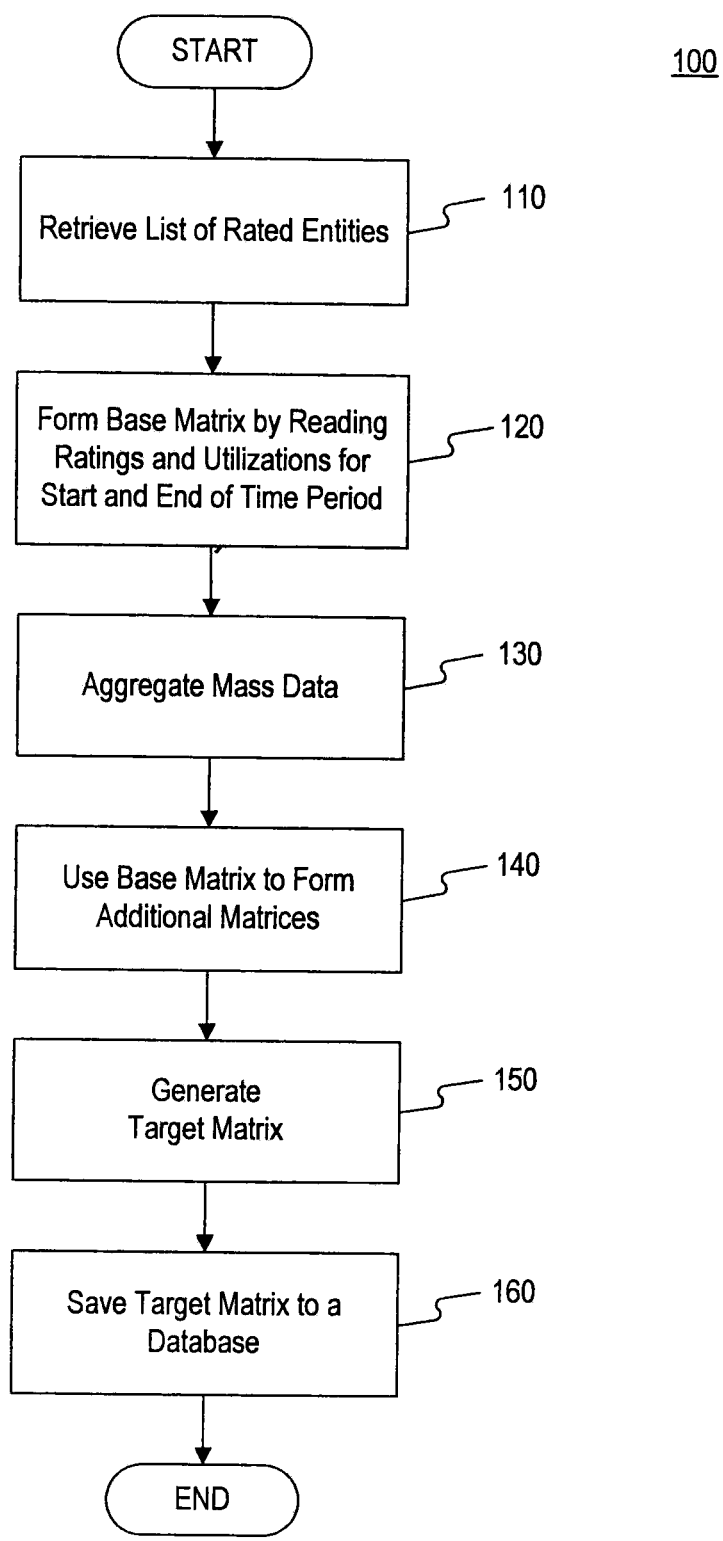
FIG. 1 is a flow diagram of an exemplary method for computing a migration and performance matrix consistent with the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Consistent with the present invention, systems and methods are provided for computing migration and performance matrices. As used herein, a "migration and performance matrix" refers to a data structure including data that measures changes and performance statistics of one or more businesses. For example, a migration and performance matrix may reflect the contribution of measured actions and events of a business' performance within a time period under consideration. Actions and events that may be considered for a given time period include, for example, changed credit risk assessment of existing customers; business with new customers; customers lost during the time period; business extended with existing customers; business reduced with existing customers; and changes due to adjustments in currency exchange rates. Migration and performance matrices may bring together data from migration matrices reflecting a likelihood that rated entity will change its current rating within a given time period; information reflecting retention rates; and information describing the effect of changed exchanged rates on different data, for example. Accordingly, a migration and performance matrix may consolidate data consistent with RAPM and economic capital frameworks in one data structure. Furthermore, migration and performance matrices consistent with the present invention may be useful to meet the requirements of the New Basel 2 Capital Accord.

In accordance with embodiments of the present invention, migration and performance matrices can provide a comprehensive view of a portfolio of data that is useful, for example, for a bank monitoring investments. A migration and performance matrix may measure inflows and outflows to a portfolio, as well as acquisitions and acquisition performance. An "acquisition" may include a new company or asset that is acquired by a portfolio and acquisition performance refers to a measurement of the contribution of an acquired asset to a portfolio over a measured period of time.

A portfolio comprises a collection of "entities," which may be rated. Entities are assets such as stocks, bonds, companies, and any other right or access to present or future economic benefits that are controlled by the owner of the entity. The system used to determine the rating may be internal to the company, such as a bank, monitoring a portfolio and using its own rating system. Alternately, the rating system may incorporate rating information provided by an external vendor, such as Moody's Investors Service, which provides credit ratings to assist investors with analyzing the credit risks associated with fixed-income securities.

Consistent with embodiments of the invention, one or more graphical user interfaces (GUIs) may be provided for a user to customize data used to calculate a migration and performance matrix. The GUI may serve as a user-friendly interface to permit a user to measure a portfolio's performance. Through the GUI, the user may be prompted with instructions to configure certain parameters prior to viewing a migration and performance matrix summarizing the portfolio. These prompts may be non-technical or orientated according to the needs of the user. Further, these prompts may be presented through a set of questions, input forms, tables, diagrams, charts and/or any other form of appropriate presentation. In one embodiment, one or more screens predefined and stored in memory may provide a user with selectable options to drive the GUI and enter configuration settings by the user. For example, a user may specify the start and of a time period for which the user would like to measure a portfolio's performance. The user may also specify which entities that the user would like to measure.

Consistent with embodiments of the invention, once a user has selected and configured the data the user would like to analyze, the system may automatically generate a migration and performance matrix showing the risk and performance data relevant to the entities selected by the user.

For example, in one embodiment, a list of rated entities may be displayed to a user. The list may be retrieved from a database containing rating information for entities. Data may be captured for a selected rating period, which may correspond to start and end dates provided by the user, for example. Next, ratings and utilization for selected entities are read for the rating period to create a base matrix before aggregation. Ratings may reflect an internal or external rating system, such as Moody's. "Utilization" refers to the monetary exposure of a particular entity. In addition, the base matrix before aggregation may take into consideration an inflow and/or outflow status of an entity. For example, an inflow/outflow status may indicate whether the rated entity is new to the portfolio, is a prior entity that was part of the portfolio, or is an entity that left the portfolio. Next, data is aggregated to form a base matrix after aggregation. In this step, rated entities with the same rating migration over the rating period are aggregated. In order to aggregate, a rated entity must have the same rating migration and status, which are discussed more fully below. Matrices reflecting data for the portfolio are then manipulated and analyzed before being arranged in a target format. The target format may constitute a migration and performance matrix, which may be saved to a database and/or may be viewed by a user on a display.

Referring to FIG. 1, a flow diagram is provided of an exemplary method 100 for computing a migration and performance matrix, consistent with an embodiment of the present invention. At the start of the process, the system (see, e.g., FIG. 7) may retrieve a list of rated entities (step 110). As part of this step, a user interface (such as a GUI) may be provided to prompt the user to make selections, such as of a source file or database containing a list of entities, and/or to specify the start and end of a time period for which the user would like to measure a portfolio's performance. As described above, this may be implemented through, for example, a GUI module.

Once the list of rated entities is retrieved, the system may form a base matrix by reading ratings and utilizations for the start and end of the rating time period to create a base matrix before aggregation (step 120). During this step, large amounts of data for rated entities may be read from one or more historical databases. Mass data may be stored in the one or more historical databases comprising, for example, millions of records. Further, the mass data may include sets of rows and sets of columns, where each row corresponds to a record, and each column includes fields of data characteristics. A user, such as a employee at a bank, will either use an internal rating system or use external ratings. Although the historical database is read, complete records may not be retrieved. Instead, only certain fields of data tables or records that are needed may be retrieved from the databases. As indicated, a rated entity carries a rating and the rating method may be an external rating system (such as Moody's, for example) or may be a method devised internally by the user.

One of the types of data that may be read for the rating time period for an entity is a utilization value. The term "utilization" refers to a measurement of a monetary exposure of a rated entity. For example, a rated entity may have a line of credit from a bank, or other debts or key figures. The term "key figure" refers to a monetary exposure that has been defined by the user. To create the base matrix before aggregation, the data may be transformed into a new table where the ratings at the beginning and ending of the rating period are listed in one row of the table. One or more intermediary matrices may be formed in step 120 in order to eliminate unnecessary data and/or rearrange data into an appropriate format. The base matrix before aggregation is discussed in more detail with regard to the example of FIG. 10.

As further shown in FIG. 1, in step 130, the mass data is aggregated to create a base matrix after aggregation. The base matrix after aggregation is discussed in more detail with regard to the example of FIG. 11. Once the base matrix after aggregation is created, the base matrix after aggregation is used to form several additional matrices that are used in the process, at step 140. Various operations are conducted and efficient parallel processing algorithms may be implemented to process large volumes of data. In step 140, the base matrix after aggregation is reused repeatedly and additional matrices are created, such as those described more fully below with regard to the examples of FIGS. 12-21. Next, in step 150, the new matrices are arranged in a target form, which is the migration and performance matrix. In step 160, the migration and performance matrix may be saved to a database, output to a display, and/or transmitted over a network, for example. An exemplary migration and performance matrix is discussed more fully with regard to FIG. 22.

Figure 2:
FIG. 2 illustrates an exemplary user interface for customizing a migration and performance matrix consistent with the present invention.

Referring now to FIG. 2, an exemplary user interface 200 is illustrated that may be implemented to enable a user to specify parameters to generate a migration and performance matrix. User interface 200 may be displayed when a user selects an option to initiate a calculation from a menu, for example. Further, user interface 200 may allow a user to enter data through the use of text fields, check boxes, and/or drop down selectable lists, for example.

User interface 200 includes, for example, various fields from which a user may select and specify parameters in order to calculate a migration and performance matrix to the user's requirements. Assume, for example, that the system is implemented with software, such as bank analyzer software. A first grouping of options 210 may allow a user to specify parameters indicating a source of data used by the bank analyzer software. For example, an "ID of Layer" field may allow the user to identify a database where the software will store the results of the calculation. A "Matrix ID" field is an identifier that links to user customization features that allow a user to customize aspects of the calculation, as described in connection with FIG. 3. A "Result Matrix" field is an identifier for defining the type of matrix to be calculated. An "Evaluation Currency" field allows the system to perform an internal currency conversion if the currency units that are used in the rated entity data differ or if the user would like to have the matrix calculated in a different currency. A "Key Date" field is used so that only those records are read from the database and used for the calculation of the matrices that have a validity date less than or equal to the key date. This accounts for versioning of records in the database since some databases may store different versions of records reflecting the state of the data at differing dates. In addition, a "System Date/Time" field may be changed by the user, but is typically set to the current date and time.

Through another grouping of options 220, a user may also select the analysis period. For example, a "Consider Ratings Until" field may be provided to allow a user to specify how far back to search the databases to find the last valid rating before beginning the analysis period. A "Start of Period" field establishes when to begin the analysis period. An "End of Period" field indicates the end of the analysis period. Further, in a data collection grouping 230 a "Group ID of Selection" specifies a grouping variable for sorting the selection ID, and a "Selection ID" field defines the database where the rated data is stored.

A user may also make selections through a technical settings grouping 240 in user interface 200 to specify technical settings that will influence the calculation. For example, a "Parallel Processing" field is a flag indicating whether the process has to be run in parallel mode using several batch servers for higher performance. A "Test Run" field indicates, when its flag is set to a value "X", that data is not stored to the database but is instead displayed on screen in a report. Also, a "Layout" field may be provided to indicate the layout of the screen columns, such as which columns to display in which order or sorting.

Figure 3:
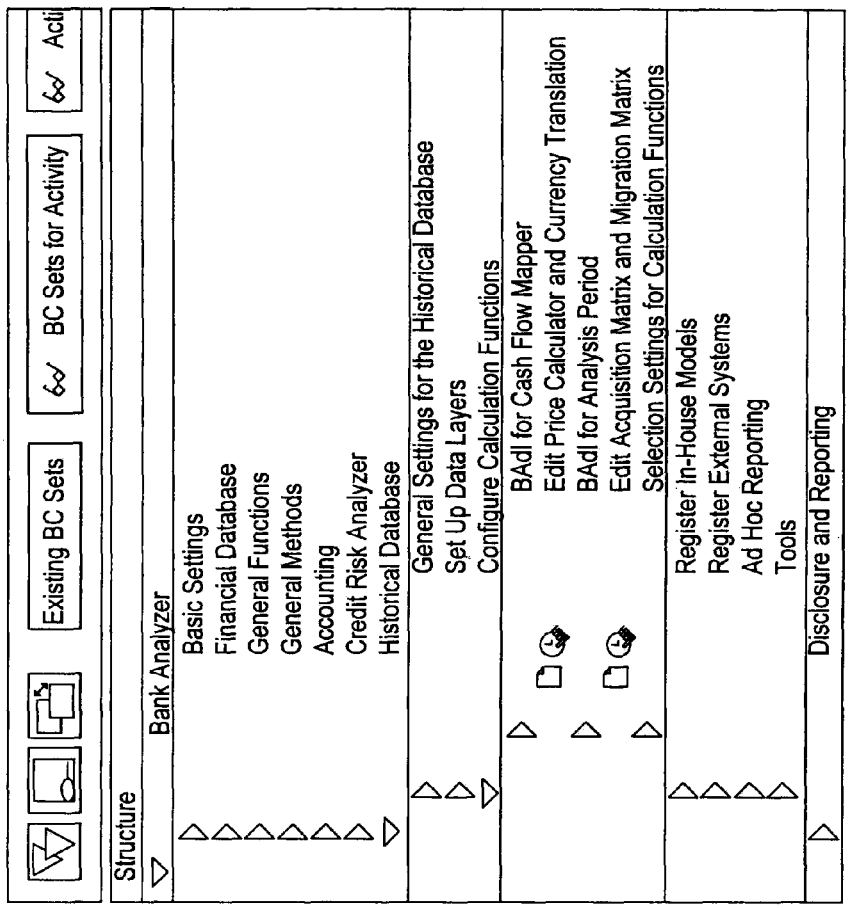
FIG. 3 is another exemplary interface for customization by a user of systems, consistent with the present invention.

Referring to FIG. 3, an exemplary user interface 300 is shown for customizing a calculation process of bank analyzer software. For example, a user may select from a list of options, such as editing a matrix. Software and computer systems consistent with the present invention may be highly customizable, and therefore, a user may select from a variety of options, including basic settings, that specify user interface preferences, for example. In addition, a user may specify financial databases, including historical databases, from which to retrieve rated entity data. General functions, general methods, accounting, and credit risk analyzer options are also available. As shown in FIG. 3, the options may be displayed using a collapsible list of options, which allows a user to expand the list as needed to change settings.

FIG. 4 shows another exemplary user interface 400 for defining names of the granularity fields of the database tables. For example, a user may choose a field from a given field repository of the databases where the description of the field is already provided. In a similar fashion, as illustrated in FIG. 5, a user interface 500 may be provided for setting the names of the rating methods that are used to rate the entities in the database. For example, as shown in FIG. 5, Moody's Rating system may be specified under the "Name" field for a rating method. Additionally, FIG. 6 shows an exemplary user interface 600 that allows a user to specify a status of an entity. An entity status may refer to a value of 1, 2, or 3, for example. A value of "1" may indicate that an entity is a new rated entity to a group or portfolio. A value of "2" may indicate that an entity is a prior entity that was already a member of the group or portfolio. A value of "3" may indicate an entity that left a group. One skilled in the art will recognize that these values are exemplary and a variety of alternatives may be provided while keeping with the spirit and scope of the present invention.

Figure 7:
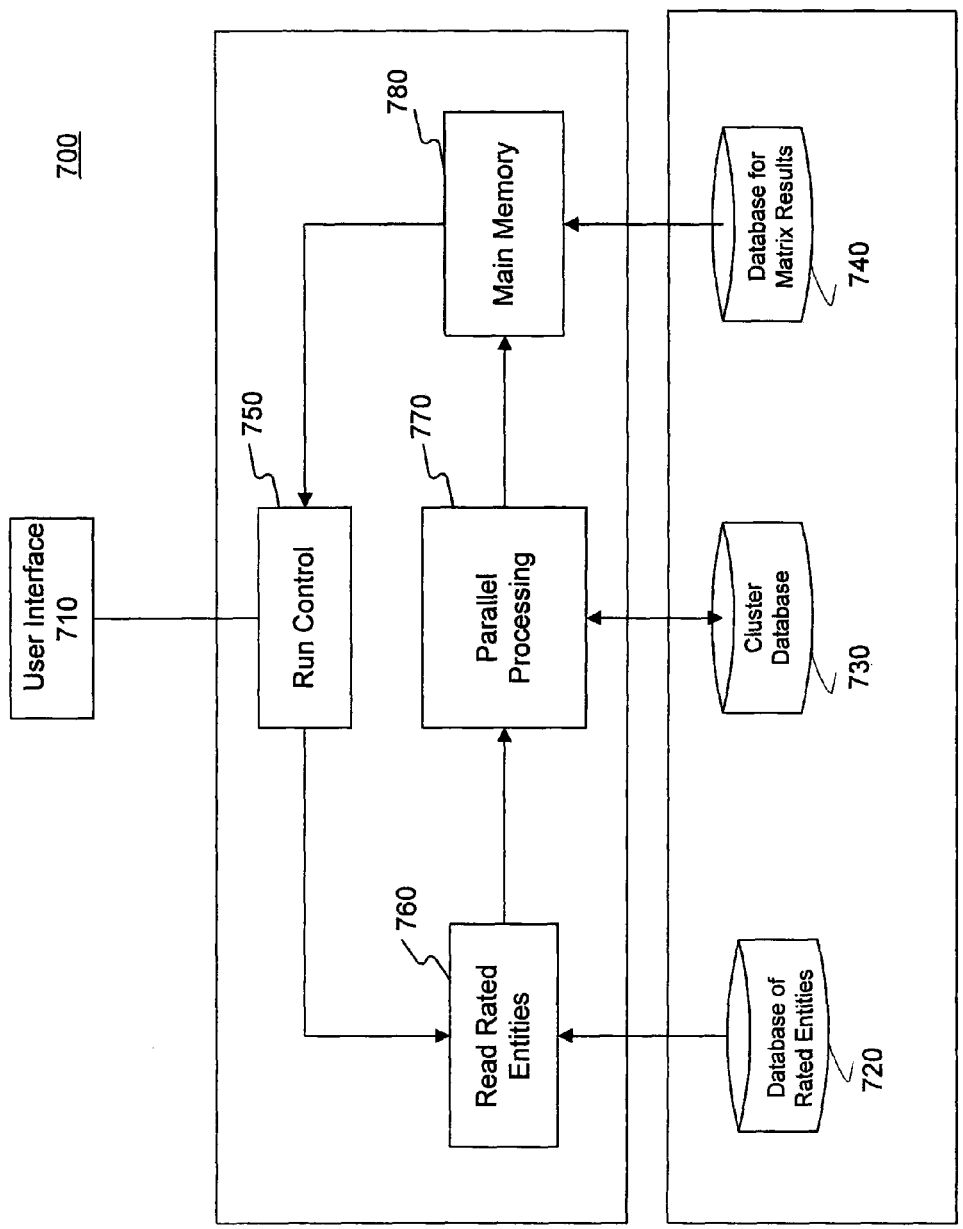
FIG. 7 is a diagram of an exemplary platform for computing and analyzing migration and performance matrices.

FIG. 7 is a diagram of an exemplary system platform 700 to implement systems and methods for computing and analyzing migration and performance matrices, consistent with the present invention. As shown in FIG. 7, a user interface 710 allows a user to interact with platform 700. While only one user interface is shown, there can be multiple user interfaces, such as GUIs, for allowing a user to interact with platform 700. As further shown in FIG. 7, data is stored in a database 720. For example, data for rated entities can be stored in database 720 or, alternatively, several database servers and multiple databases may be provided that are local or connected by a network (not shown) to system 700. Other databases may be also be provided, for example, a cluster database 730 may be used to store temporary data and a database 740 may be used to store matrices and other results of the calculations. In addition, the processes discussed above in connection with FIG. 1 may be run in parallel on several batch servers.

For example, a user may operate user interface 710 to initiate processing, which, in turn, may access a run control module 750 to control processing. Run control module 750 may, in turn, instruct read rated entities module 760 to access mass data stored in database 720. Read rated entities module 760 may instruct parallel processing module 770 to execute processing instructions to format and arrange the mass data into one or more target matrices. In addition, intermediary matrices may also be created during parallel processing and these temporary matrices and any temporary data may be stored in cluster database 730. Parallel processing module 770 may store resulting matrices in main memory 780, database 740, or may provide results to run control module 750 for display to a user on a display (not shown). For example, at the start of the process (see, e.g., FIG. 1), system 700 may retrieve data used for calculating matrices. Data may be stored in one or more historical databases, such as, for example, database 720.

Figure 8:
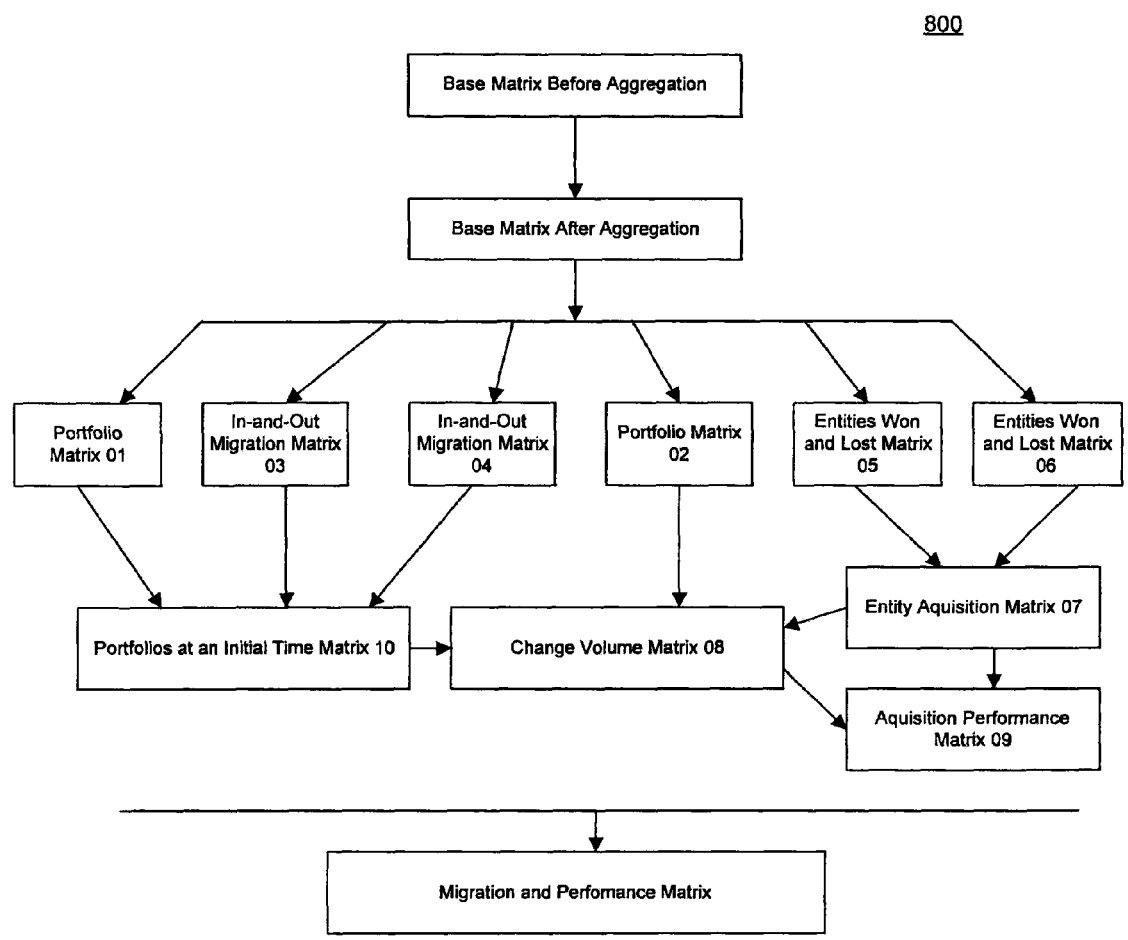
FIG. 8 is a diagram showing exemplary relationships between matrices, consistent with an embodiment of the present invention.

Turning to FIG. 8, a diagram 800 is provided that illustrates exemplary relationships between matrices, consistent with an embodiment of the present invention. For example, as discussed earlier with regard to step 120 of FIG. 1, mass data may be retrieved to form a base matrix before aggregation by reading ratings data and utilizations over a rating period. An exemplary base matrix before aggregation is discussed in more detail with regard to FIG. 11. Further, as discussed in connection with step 130 of FIG. 1, the mass data may be aggregated to create a base matrix after aggregation, an example of which is discussed with regard to FIG. 12.

From the base matrix after aggregation, several additional matrices may be generated. These additional matrices, which are discussed more fully below, include a portfolio matrix 01 (discussed in connection with FIG. 13), an in-an-out migration matrix 03 (discussed in connection with FIG. 15), an in-and-out migration matrix 04 (discussed in connection with FIG. 16), a portfolio matrix 02 (discussed in connection with FIG. 14), an entities lost matrix 05 (discussed in connection with FIG. 17), and an entities won matrix 06 (discussed in connection with FIG. 18).

Further, additional matrices may be formed or generated by performing operations upon these matrices. For example, a portfolios at an initial time matrix 10 (discussed in connection with FIG. 20) may be formed by performing mathematical operations on portfolio matrix 01, in-and-out-matrix 03, and in-and-out matrix 04. An entity acquisition matrix 07 (discussed in connection with FIG. 19) may be formed by performing mathematical operations on entities lost matrix 05 and entities won matrix 06. A changed volume matrix (discussed in connection with FIG. 21) may be formed by performing mathematical operations on portfolio matrix 02, portfolios at an initial time matrix 10, and entity acquisition matrix 07. And, an acquisition performance matrix 09 (discussed in connection with FIG. 22) may be formed by performing mathematical operations on entity acquisition matrix 07 and changed volume matrix 08. One or more of the above matrices may be arranged into a target matrix, such as a migration and performance matrix (discussed in connection with FIG. 23).

Referring now to FIG. 9, an exemplary table is shown of collected data that may be retrieved by system 700. The collected data may include one or more of the following fields. For example, a "Segment ID" (SID) field refers to a business segment, such as automotive, financial, etc. A "Rating Method" (RM) field refers to the type of rating system used for the entity, such as whether the entity was rated with an internal or external rating system. A "Business Partner" (BUPA) field identifies a business partner ID of the entity, if any. A "Rating Valid From" (RDAT) field specifies a rating date, which indicates a date from which the rating is valid from. A "Rating" (RAT) field may specify a rating of the entity based on the rating method, such as, for example, a rating given in a letter grade scale or in a numerical scale. The Rating may provide an indication of a degree of risk associated with an entity. In addition, an "Inflow/Outflow" (IO) field may specify a status classification of an entity. For example, an entity status may refer to a value of 1, 2, or 3, for example. A value of "1" may indicate that an entity is a new rated entity to a group or portfolio. A value of "2" may indicate that an entity is a prior entity that was already a member of the group or portfolio. A value of "3" may indicate an entity that left a group. A "Utilization" (UTIL) field may indicate an appropriate utilization value for an entity, such as a value of an entity is drawing on a credit loan. Further, a "Currency" (CURR) field may specify the currency type of a value specified in the utilization field. For example, "USD" refers to a currency type of United States dollars.

FIG. 10 is an exemplary matrix that includes a subset of the data shown in FIG. 9. The data included in FIG. 10 includes, for example, the Segment ID, Rating Method, and Business Partner fields. Accordingly, FIG. 10 shows data that is extracted from the table of FIG. 9 to create a new table, as discussed above, for example, in connection with step 120 of FIG. 1.

Referring now to FIG. 11, an exemplary table is shown prior to the aggregation of data. As discussed earlier in connection with step 120 of FIG. 1, mass data is aggregated to form a base matrix before aggregation. In the table shown in FIG. 11, the data is provided in another format where ratings at a start time (t0) and ratings at an end time (t1) are given in one row of the table. In FIG. 11, the "RT0" field indicates a rating of the time series that was most recently assigned before t0 was copied to the field RT0. The "RT1" field indicates a rating of the time series that was most recently assigned before t1 was copied to the field RT1. The "UT0" field indicates a utilization of the time series that was previously assigned to the rating that is now in field RT0. The "UT1" field is a utilization of the time series that was previously assigned to the rating that is now in field RT1. The "FX" field is a conversion of the utilizations to the evaluation currency with the evaluation times t0 and t1. Differences in the utilizations of t0 and t1 that are caused by foreign exchange are stored in the new field FX. The "CURR" field indicates the type of evaluation currency.

In one embodiment, ratings and utilizations at an initial time (to) and an end time (t1) are read from a historical database to create a base matrix before aggregation. In the next step the mass data is aggregated and a base matrix after aggregation is obtained. The aggregated base matrix is used to calculate the different matrices used in the remainder of the process. To increase efficiency in processing speed, processing of the data may be done by parallel processing algorithms. For example, a computer-implemented method for automated generic and parallel aggregation of characteristics and key figures of mass data may be integrated into system platform 700 using parallel processing module 770. Examples of computer-implemented methods and systems for automated generic and parallel aggregation of mass data are provided in U.S. Provisional Application No. 60/614,401, entitled "Systems and Methods for General Aggregation of Characteristics and Key Figures," filed Sep. 30, 2004, the disclosure of which is incorporated herein by reference in its entirety.

Turning to FIG. 12, an exemplary matrix after aggregation of data is shown. As discussed earlier, this matrix may provide a starting point or a base matrix for several additional matrices and can be re-used several times. For example, the table shown in FIG. 11 is aggregated to result in the table shown in FIG. 12. The base matrix after aggregation typically contains significant less data than the originally used mass data. For example, the base matrix after aggregation may contain at most a few thousand data records.

Consistent with embodiments of the invention, the following provides exemplary options that may be performed to provide different views on the data. For example, the base matrix after aggregation may be processed into one more additional matrices. The one more additional matrices, referred to as "result matrices," may include, for example, portfolio matrices at specified times, migration matrices, acquisition matrices, matrices concerning in and out flows, matrices concerning changes of volume and/or combinations of two or more of these matrices, such as an acquisition and migration matrix.

By way of example, FIG. 13 is an exemplary table of data referred to as portfolio matrix 01. Portfolio matrix 01 may be based on the matrix after aggregation whether the granularity is reduced to SID, RM, and RT0. For the aggregation to produce portfolio matrix 01, the fields "UT0," "CNT," and "FX" are summed together. In addition, the field RT0 is set to "not empty" and the inflows are not considered because they do not have a rating at to.

FIG. 14 is an exemplary table of data referred to as portfolio matrix 02. Portfolio matrix 02 may be based on the basic matrix after aggregation. In this matrix, the granularity is reduced to SID, RM, and RT1. In addition, the fields "UT1," "CNT," and "FX" are summed together and the field RT1 is set to "not empty." The outflows are not considered because they have no rating at t1.

FIG. 15 shows an exemplary in and out migration matrix 03. Matrix 03 may be based on the basic matrix after aggregation where the granularity is reduced to SID, RM, RT0 and RT1. Given a specific rating at the beginning of a period, this matrix shows which rating category a customer appears in at the end of the period. To form this matrix, the fields "UT0," "UT1," "CNT," and "FX" are summed together. RT0 is set to "not empty" and RT1 is set to "not empty" because the inflows and outflows are not considered. In addition, RT0 should not equal RT1.

FIG. 16 shows an exemplary in and out migration matrix 04. Given that an entity has a specific rating at the end of a period under consideration, this matrix shows which rating the entity had at the beginning of the period. This matrix is generated by transposing matrix 03, and by taking the inverse of "UT0" and "UT1."

FIG. 17 shows an exemplary entities lost matrix 05. This matrix indicates which entities (such as customers) have been lost in a specific time period. The fields "UT0," "CNT," and "FX" are summed to arrive at this matrix. In one embodiment, only the records of the base matrix after aggregation are used where the indication of an outflow is given. Further, FIG. 18 shows customers an exemplary entities won matrix 06. This matrix indicates which entities (again, customers or other entities) have been won in the specific time period. The fields "UT1," "CNT," and "FX" are summed together to arrive at this matrix.

FIG. 19 shows an exemplary entities acquisition matrix 07. The net results of entities won and entities lost is a key for accessing the success of entities acquisition strategy. To calculate matrix 07, the sum of matrix 05 and matrix 06 is computed. To prepare the calculation, the contents of the fields RT0 and RT1, respectively, and UT0 and UT1, respectively, are at first moved to the fields RING and UTLZ, thereby temporarily modifying matrix 05 and matrix 06. Then the values of UTLZ of the modified matrix 05 and matrix 06 are summed based on the granularity SID, RM, and RTNG. For the result matrix 07, the values RT0, RT1, UT0, and UT1 may be ignored.

FIG. 20 shows an exemplary portfolio after migrations at t1 matrix 10. Taking into account all of the changes of a rating with existing entities allows one to consistently integrate the effect of entity rating migration and to set a consistent basis to later include the effect of acquiring a new business. Matrix 10 is calculated by summing matrix 01, matrix 03, and matrix 04. To calculate the sum of the matrices, the ratings "RT0" and "RT1" and the utilizations "UT0" and "UT1" are moved to the fields "RTNG" and "UTLZ." After that, the values of "UTLZ" are summed.

FIG. 21 shows an exemplary changed volume matrix 08. This matrix indicates whether one can extend business with existing customers or other entities. The matrix is calculated as follows: Matrix 08=matrix 02−matrix 10−matrix 07. To calculate the difference of the matrices, the ratings "RT0" and "RT1" and the utilizations "UT0" and "UT1" are moved to the fields "RTNG" and "UTLZ." After that, the values of "UTLZ" are summed.

FIG. 22 shows an exemplary acquisition performance matrix 09. The overall acquisition success rate is used to further analyze, for example, customer retention as well as success of broadening the customer base. In may include won customer relations, lost customer relations, and changed volume with existing customers. The acquisition performance matrix 09 is calculated as follows: matrix 09=matrix 07+matrix 08. The values of "UTLZ" are summed. The sum means that the utilization (herein referred to as "UTLZ") is summed for the same combinations of granularity fields in both matrices. Since matrix 09 has the granularity SID, RM, and RTNG, those values of matrix 07 are summed that have the identical SID, RM, and RTNG.

FIG. 23 shows an example of a resulting migration and performance matrix, consistent with the present invention. By way of example, a user of system platform 700 may make selections from an appropriate interface (such as those discussed in connection with FIG. 2) to compute a target matrix, such as, for example, the resulting migration and performance matrix shown in FIG. 23. The migration and performance matrix may provide a complete overview of the changes that have occurred to a portfolio within a given time period. To arrive at the matrix shown in FIG. 23, one may arrange previously calculated matrices in an order. The order may be given by the field KEY (sorted ascending). In addition, the new table may be sorted by other fields, such as the fields RING, RT0, and RT1 in ascending order.

Based on the information in the resulting migration and performance matrix, such as that shown in FIG. 23, management and/or other key personnel are provided with better information to make financial decisions; for example, adjust customer acquisition strategy, focus on customer retention, and/or react to unfavorable rating migration effects. All of these actions may be taken by different parties within the financial institution, but the consistent information may facilitate consistent actions and coordination among managers.

Customer acquisition strategy is of high importance for a financial institution, such as a bank, when conducting a growth strategy. Further, at the same time, banks also face a risk of acquiring customers that have below average rating grades. In the example of FIG. 23, the rows that include a key value of 7 allow one to identify the extent of the bank's success in controlling risks while, at the same time, achieving a target level of growth. The rows that include a key value of 7, in this example, show that customers have been acquired having both a good rating (a letter grade of A) and a low rating (a letter grade of D).

In addition, once a bank has successfully established a relationship with a customer, the financial institution may then work to retain the customer. The customer will continue to provide business to the bank if the bank demonstrates an understanding of the customer and serves the customer's needs. Accordingly, as shown in FIG. 23, the rows that include a key value of 8 provide an indication of the bank's success in conducting further business with an existing customer base.

In the example shown in FIG. 23, the bank has lost some business. However, the bank may gain additional important information from FIG. 23 in such a situation. In particular, the bank may find it useful to know how the rating of entities has changed when a loss in volume of business with those entities has occurred. A bank typically reduces or restricts business with entities that have a low rating and attempts to expand business with entities that have a high rating. In the example, most of the volume lost was to entities having a low rating (in this example, letter grades of C and D). Such a loss of volume may be consistent with a business objective to reduce risk. On the other hand, in the example, the bank also faces limited losses with entities that have a higher rating (in this example, letter grades of A and B). These losses may be a warning sign should the bank's strategy include expansion of business in this customer segment.

Further, the bank may also like to limit the risk in its credit portfolio since it is not possible to completely eliminate credit risk. A high rate of customer default may result in high and unexpected losses for the bank. Accordingly, the bank may endeavor to control its exposure to credit risk. As shown in FIG. 23, a comparison of key values of 1 and 10 provide the bank with an overview of how the portfolio has changed over time. Unfavorable movements will trigger management decisions to adjust the portfolio in reaction to unfavorable rating migration effects.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets or in SAP R/3 or ABAP. One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed:

1. A method for computing a migration and performance matrix using a data processing system, the method comprising:
  receiving, by a processor, a selection of rated entities from a user;
  retrieving, by the processor from a database, mass data for the selected rated entities for a rating period;
  creating, by the processor, a first base matrix based on ratings and utilizations for the selected rated entities for the rating period;
  receiving at least one of an inflow or an outflow status for the selected rated entities;
  storing the received status in the first base matrix;
  forming, by the processor, a second base matrix based on the first base matrix;
  forming, by the processor, a plurality of additional matrices based on the second base matrix;

arranging, by the processor, the additional matrices in an order according to one or more fields of the additional matrices; and generating, by the processor, the migration and performance matrix by combining the additional matrices in the order.

2. The method of claim 1, wherein the received status indicates whether a rated entity is new to a portfolio, is a prior entity that was part of the portfolio, or is an entity that has left the portfolio.

3. The method of claim 1, wherein the arranging of the additional matrices further comprises arranging the additional matrices in one of an ascending order or a descending order according to values of the one or more fields of the additional matrices.

4. The method of claim 3, wherein the one or more fields of the additional matrices include at least one of a key or a rating associated with the rated entities.

5. The method of claim 1, wherein the additional matrices include at least one of a portfolio matrix, a migration matrix, an acquisition matrix, an in-and-out flow matrix, or a change matrix.

6. The method of claim 1, wherein the second base matrix includes a smaller amount of data than the mass data retrieved from the database for the selected rated entities.

7. A system for computing a migration and performance matrix, the system comprising:
   a non-transitory computer-readable medium storing instructions; and
   a processor for performing a method by executing the instructions, the method comprising:
   receiving a selection of rated entities from the user;
   retrieving data from a database for the selected rated entities;
   creating a first base matrix based on ratings and utilizations for the selected rated entities for at least one rating period;
   receiving at least one of an inflow or an outflow status for the rated entities;
   storing the received status in the first base matrix;
   forming a second base matrix based on the first base matrix;
   forming a plurality of additional matrices based on the second base matrix;
   arranging the additional matrices in an order according to one or more fields of the additional matrices; and
   generating the migration and performance matrix by combining the additional matrices in the order.

8. The system of claim 7, wherein the received status indicates whether a rated entity is new to a portfolio, is a prior entity that was part of the portfolio, or is an entity that has left the portfolio.

9. The system of claim 7, wherein the arranging of the additional matrices further comprises arranging the additional matrices in one of an ascending order or a descending order according to values of the one or more fields of the additional matrices.

10. The system of claim 9, wherein the one or more fields of the additional matrices include at least one of a key or a rating associated with the rated entities.

11. The system of claim 7, wherein the additional matrices include at least one of a portfolio matrix, a migration matrix, an acquisition matrix, an in-and-out flow matrix, or a change matrix.

12. The system of claim 7, wherein the second base matrix includes a smaller amount of data than the data retrieved from the database for the selected rated entities.

* * * * *